Patented Dec. 30, 1930

1,786,941

UNITED STATES PATENT OFFICE

WILHELM ELLER AND TOTILA MADLUNG, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR DESULPHURIZING ARTICLES CONSISTING OF REGENERATED CELLULOSE

No Drawing. Application filed May 7, 1928, Serial No. 275,957, and in Germany July 13, 1927.

The present invention relates to a new process for desulphurizing articles consisting of regenerated cellulose and obtainable by coagulating a viscose solution brought into any desired form.

These articles in the form of threads, bands, films, artificial horse-hair or the like, have to be freed from sulfur which has been precipitated upon them in the coagulating process in order that they may have the desired lustre. This sulfur is generally removed by means of a dilute solution of sodium sulfide or dilute caustic soda lye, or a dilute sulfite solution.

The process of this invention consists in removing this sulfur by means of a solution of the by-products which occur in cellulose xanthate made in the usual manner, it having been found that such by-products constitute a good solvent for sulfur.

In the normal manufacture of cellulose xanthate, there is obtained a yellow to red, sometimes even greenish-brown, mass (see, f. i., Valentin Hottenroth, Artificial Silk, London, page 276) which consists for the greater part of color less cellulose xanthate and contains in addition strongly colored by-products which probably consist of thiocarbonates and similar compounds. By extracting these impurities of the cellulose xanthate in any known manner there is obtained directly a solution which, if necessary after filtration or dilution, can be used for desulphurizing skeins of artificial silk or other forms of spun viscose; or the solution containing these impurities can be concentrated or evaporated in case it is desirable to recover the solvent. The strongly colored mass which remains can then be redissolved by means of water or some other solvent and used as the desulphurizing agent. It is also possible to use this new desulphurizing agent as an addition to the known desulphurizing baths.

The removal of sulfur according to the invention is very easy and occurs smoothly, imparting to the goods treated a particularly soft feel.

The following examples illustrate the manner in which the by-products, serving as desulphurizing agents according to our invention, may be obtained:

*Example 1.*—13 kilos of cellulose xanthate are thoroughly kneaded with 25 litres of aqueous methanol of specific gravity about 0.81 for 10 minutes while cooling, and then pressed. The liquor expressed is used either without addition, or after suitable dilution with water, for the purpose of desulphurizing artificial silk obtained by spinning a viscose solution.

*Example 2.*—13 kilos of cellulose xanthate are thoroughly kneaded with 25 litres of aqueous methanol of 90 per cent. strength for 10 minutes while cooling, and then pressed. The expressed liquid is distilled for recovery of the solvent. The dark colored residue is dissolved in water or another suitable solvent and this solution is used for desulphurizing artificial silk or any other form of coagulated viscose.

What we claim is:—

1. The process which comprises desulphurizing articles, consisting of regenerated cellulose and obtainable by coagulating a viscose solution, by treating them with a solution of the strongly colored by-products contained in crude cellulose xanthate.

2. The process which comprises desulphurizing artificial silk, consisting of regenerated cellulose and obtainable by coagulating a viscose solution in form of threads, by treating it with a solution of the strongly colored by-products contained in crude cellulose xanthate.

3. The process which comprises desulphurizing articles consisting of regenerated cellulose and obtainable by coagulating a viscose solution, by treating them with a solution of the strongly colored by-products contained in crude cellulose xanthate and of another desulphurizing agent of the group consisting of alkali sulfide, alkali sulfite or caustic soda.

4. The process which comprises extracting the strongly colored by-products of crude cellulose xanthate with an alcohol and desulphurizing articles made by coagulating a viscose solution, with a solution of the said by-products.

In testimony whereof, we affix our signatures.

WILHELM ELLER.
TOTILA MADLUNG.